(12) United States Patent
Deckers

(10) Patent No.: US 7,274,535 B2
(45) Date of Patent: Sep. 25, 2007

(54) MEDIA CARTRIDGE HAVING MULTIPLE TAPE POSITION SENSOR WINDOWS

(75) Inventor: Stephen Deckers, Eagle, ID (US)

(73) Assignee: Hewlett-Packard Development Company, LP, Houston, TX (US)

( * ) Notice: Subject to any disclaimer, the term of this patent is extended or adjusted under 35 U.S.C. 154(b) by 419 days.

(21) Appl. No.: 10/996,882

(22) Filed: Nov. 24, 2004

(65) Prior Publication Data

US 2006/0109590 A1 May 25, 2006

(51) Int. Cl.
*G11B 23/02* (2006.01)
(52) U.S. Cl. ..................................... 360/132
(58) Field of Classification Search ............... None
See application file for complete search history.

(56) References Cited

U.S. PATENT DOCUMENTS 4,763,217 A * 8/1988 Oishi ....................... 360/132

OTHER PUBLICATIONS

Standard ECMA-288, Jun. 1999, "3,81 mm Wide Magnetic Tape Cartridge for Information Interchange—Helical Scan Recording—DDS-4 Format", pp. 7-28 and 103.

* cited by examiner

*Primary Examiner*—A. J. Heinz

(57) ABSTRACT

A media cartridge includes a housing, a tape, and at least two tape position sensor openings in the housing adjacent the information storage tape. The tape position sensor openings are separated by a distance that is less than the height of the tape.

10 Claims, 7 Drawing Sheets

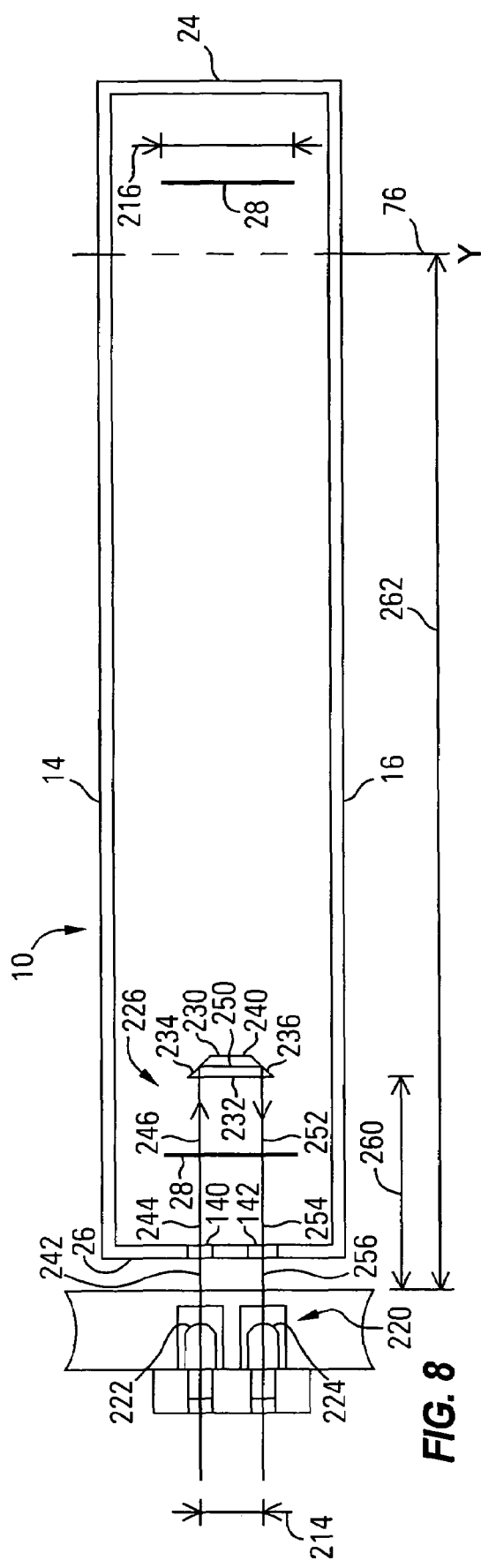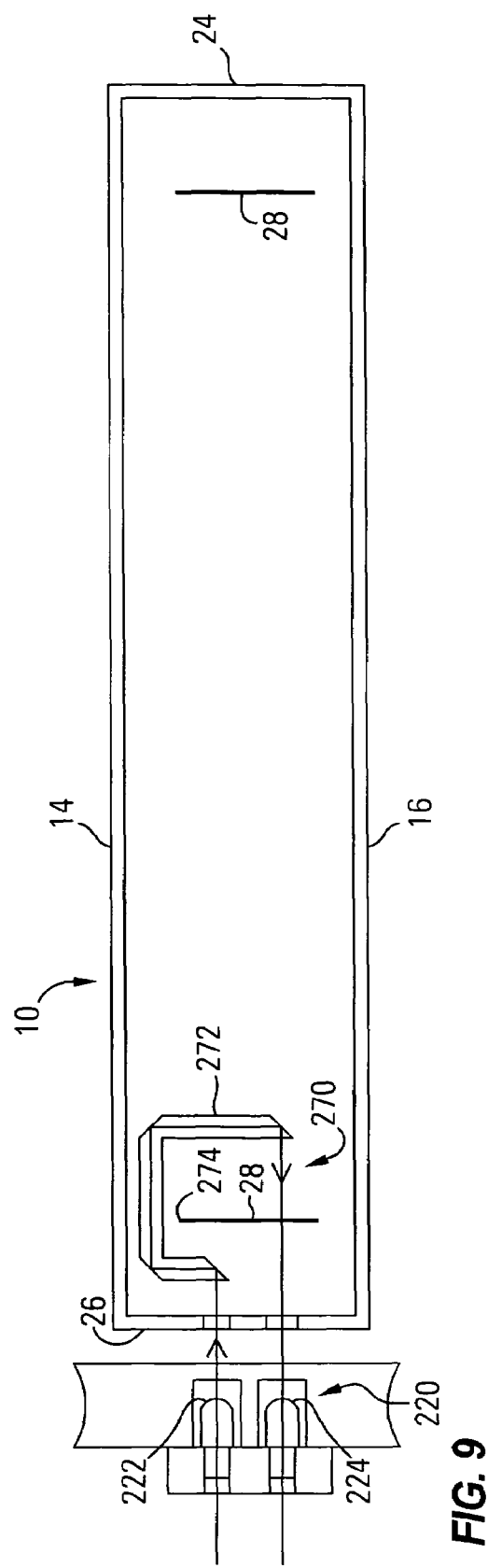

MEDIA CARTRIDGE HAVING MULTIPLE TAPE POSITION SENSOR WINDOWS

BACKGROUND

Many types of data storage systems are available for storing data. Of the known systems, magnetic tape cartridges are most commonly used for storing large amounts of data from a computer because of their relatively large capacity and low cost. A magnetic tape cartridge typically contains a pair of rotatably supported hubs, upon which an information storage medium such as magnetic tape is wound. The magnetic tape streams from one hub to the other when the hubs are rotated, exposing different segments of the tape through a window or opening in the cartridge. The magnetic tape cartridge may be inserted into a drive that rotates the hubs while reading or writing data from the exposed segment of tape. Some magnetic tape cartridge configurations include notches in the sides of the cartridge to facilitate automatic handling.

SUMMARY

In one exemplary embodiment, a media cartridge includes a housing, a tape, and at least two tape position sensor openings in the housing adjacent the tape. The tape position sensor openings are separated by a distance that is less than the height of the tape.

BRIEF DESCRIPTION OF THE DRAWINGS

Illustrative embodiments are shown in the accompanying drawings as described below.

FIG. 8 is a cross-sectional front view of an exemplary media cartridge illustrating a prism and light path for a beginning-of-media sensor.

FIG. 9 is a cross-sectional front view of an exemplary media cartridge illustrating an alternative prism and light path for a beginning-of-media sensor.

DESCRIPTION

Figure 1:
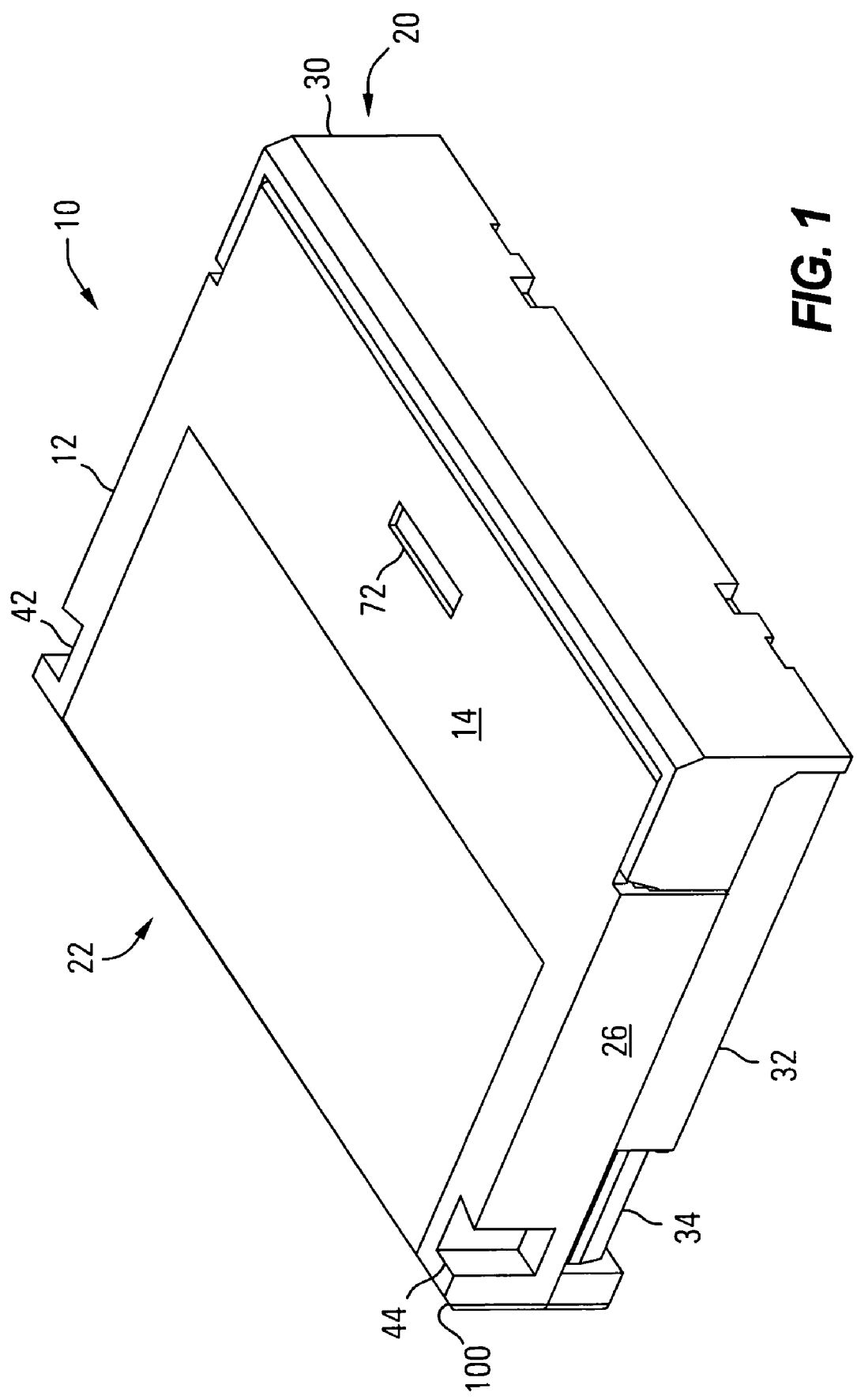
FIG. 1 is a perspective top view of an exemplary media cartridge.

The drawing and description, in general, disclose a media cartridge for storing data. The media cartridge includes an 8 mm tape, with various features that enable the use of drive mechanisms designed for traditional 3.8 mm Digital Data Storage (DDS)/DAT—Digital Data Storage 72 (DAT72) media cartridges. The storage capacity is thus much greater than traditional 3.8 mm DDS/DAT72 media cartridges, while allowing relatively easy cartridge interchange between DDS/DAT72 cartridges and the media cartridge disclosed herein within the same drive mechanism.

Figure 2:
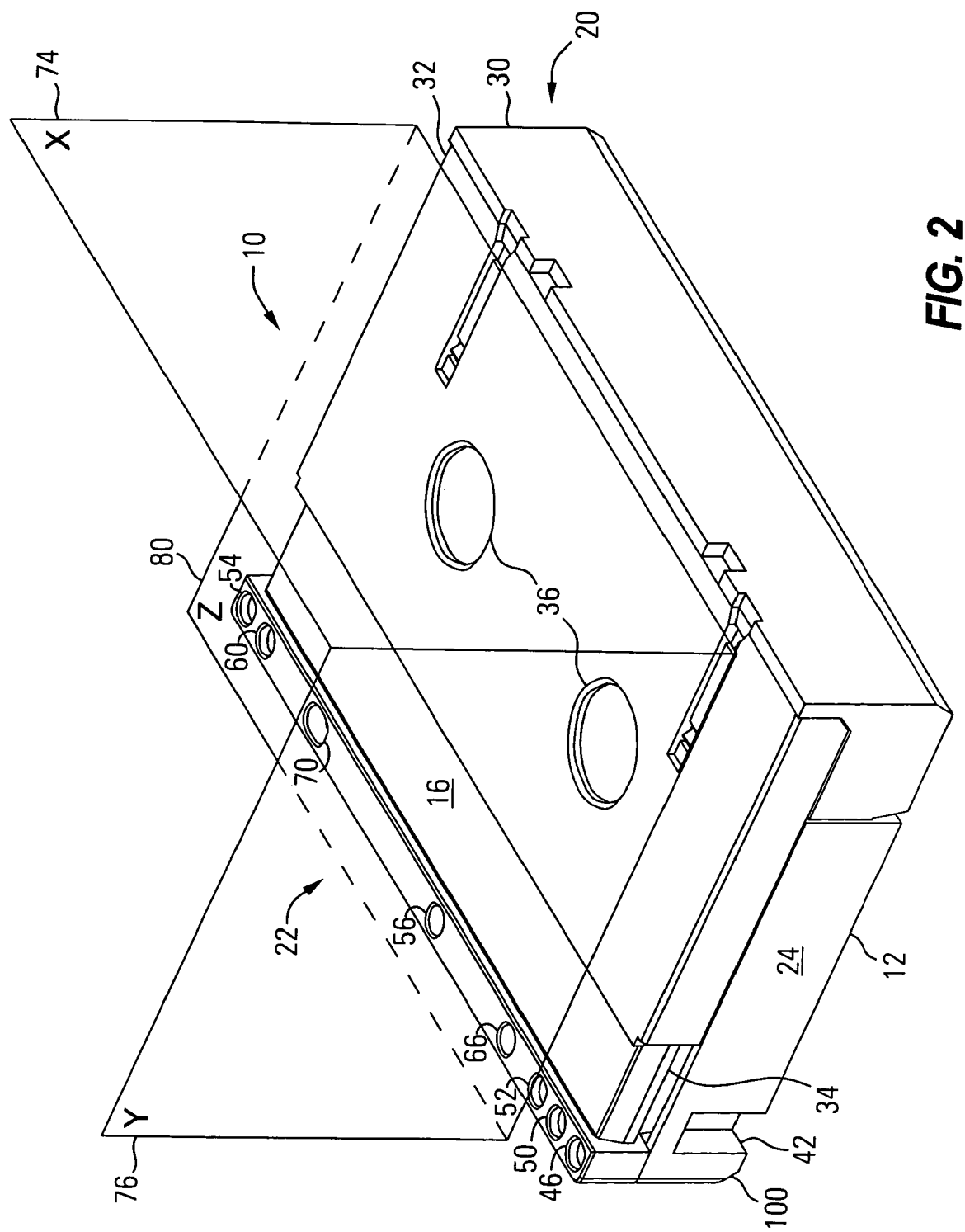
FIG. 2 is a perspective bottom view of an exemplary media cartridge.

Referring now to FIGS. 1 and 2, an exemplary embodiment of the media cartridge 10 includes a housing 12 made of any suitable substantially opaque material such as a black polycarbonate or acetal plastic material. The housing 12 includes a top 14, bottom 16, front 20, rear 22, left side 24 and right side 26. A lid 30 is pivotally mounted at a front 20 of the housing 12 to protect the 8 mm tape 28 (FIG. 8) inside the housing 12. A slider 32 is mounted on the bottom 16 of the housing 12 to protect the 8 mm tape 28. The slider 32 is mounted on a track 34, so that when the media cartridge 10 is inserted in a drive, the slider 32 is moved toward the rear 22 of the housing 12 along the track 34, exposing the 8 mm tape 28 from underneath.

The 8 mm tape 28 in one exemplary embodiment comprises a magnetic tape upon which information may be stored. Alternatively, the 8 mm tape 28 may be non-magnetic and non-recordable. For example, the media cartridge may be a cleaning cartridge with the 8 mm tape comprising a cleaning or polishing material to clean the heads in a drive mechanism. Thus, the term "media cartridge" as used herein refers to a cartridge containing any type of tape, including a magnetic recording tape or a cleaning tape for a magnetic data storage drive, etc.

The 8 mm tape 28 is wound on two rotatably supported hubs (not shown) in the housing 12. When the media cartridge 10 is inserted in a drive and the slider 32 is open, hub access holes 36 on the slider 32 are positioned adjacent the location 40 (FIG. 6) of the hubs, allowing drive spindles to engage with and rotate the hubs, thereby streaming the 8 mm tape 28 from one hub to the other. Different portions of the 8 mm tape 28 are thus exposed at the front 20 of the media cartridge 10, providing access so that the drive can read and write data.

Side handling notches 42 and 44 are provided on the left and right sides 24 and 26 of the housing 12, facilitating automated handling of the media cartridge 10 in a drive. These side handling notches 42 and 44 also serve as finger grips to aid in manually retrieving a media cartridge 10 from a drive.

A group of five recognition holes 46, 50, 52, 54 and 56 are provided on the bottom 16 of the housing 12 near the rear 22. The five recognition holes 46-56 may each be substantially filled with a plug or may be left open, together forming a pattern that identifies the format of the tape in the media cartridge 10. In one exemplary embodiment, the first three recognition holes 46, 50 and 52 near the left side 24 are substantially filled with a plug, and the remaining two recognition holes 54 and 56 are left empty. The recognition code for the exemplary embodiment is thus 00011, if plugged recognition holes are interpreted as 0 and empty recognition holes are interpreted as 1. Other recognition codes may be used to indicate variations in tape format or to provide any other information about the media cartridge.

A write-inhibit hole 60 is also provided on the bottom 16 of the housing 12 near the rear 22. The write-inhibit hole 60 may be closed in any suitable manner to enable the writing of data to the 8 mm tape or may be opened to inhibit writing of data. Datum holes 62 and 64 (FIG. 7) and sub-datum holes, one round 66 and one elongate 70, are also provided on the bottom 16 of the housing 12 near the front 20 and rear 22, respectively, to facilitate positioning the media cartridge 10 in a drive, together with a loading grip 72 and the side handling notches 42 and 44.

Dimensions for the media cartridge 10 will now be given, many in relation to three orthogonal reference planes X 74, Y 76 and Z 80 as illustrated in FIG. 2. Plane X 74 intersects the axes of datum holes 62 and 64 and is parallel to the front 20 and rear 22 of the media cartridge 10. Plane Y 76 is perpendicular to Plane X 74, intersects the axis of datum hole 64 and is parallel to the sides 24 and 26. Plane Z 80 is perpendicular to Plane X 74 and Plane Y 76, and is coincident with the bottom surface of the bottom 16 which is parallel to the top 14 and bottom 16. Plane X 74 is located at a distance 82 (FIG. 3) of about 49.2 mm toward the front 20 of the housing 12 from the rear 22. Plane Y 76 is located at a distance 84 of about 25.5 mm toward the left side 24 from a center line 86, where the center line 86 bisects the housing 12 from front 20 to rear 22, midway between the left 24 and right 26 sides. Plane Z 80 is located at a distance 90 (FIG. 5) of about 1.10 mm toward the top 14 of the housing 12 from the bottom 16. The center lines of datum holes 62 and 64 (FIG. 7) are parallel to and aligned with plane X 74.

Figure 3:
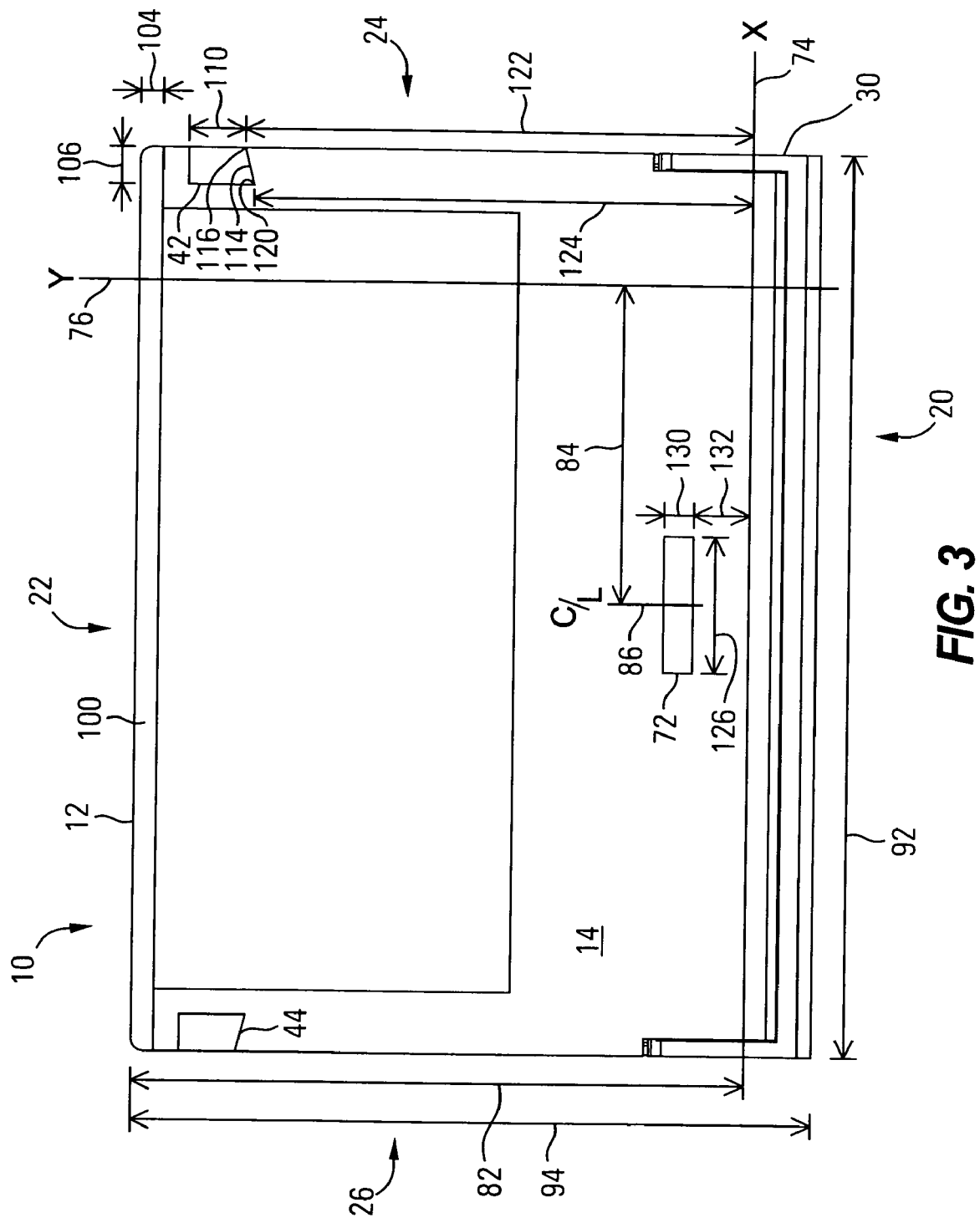
FIG. 3 is a top view of an exemplary media cartridge.
Figure 4:
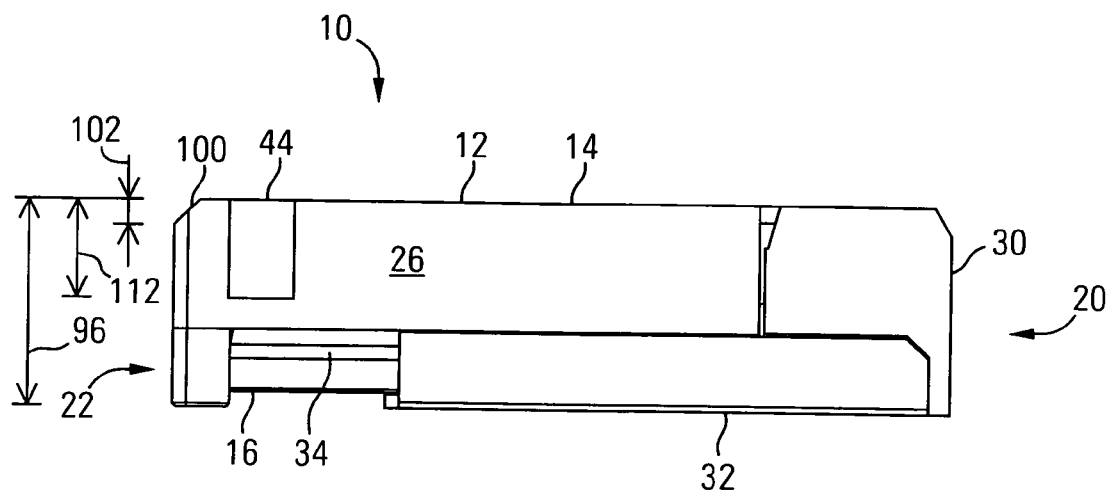
FIG. 4 is a right view of an exemplary media cartridge with a closed lid and slider.

Referring now primarily to FIGS. 3 and 4, the housing 12 may be between about 72.5 and 73.5 mm wide 92 from side 24 to side 26, about 53.5 and 54.5 mm deep 94 from front 20 to rear 22, and about 14.2 and 15.2 mm tall 96 from top 14 to bottom 16. In the exemplary embodiment, the housing 12 is about 73.0 mm wide 92, 56.0 mm deep 94 and 14.7 mm tall 96. The edge 100 formed by the top 14 intersecting with the rear 22 may be chamfered, which in some drives may allow additional room for a drive door to open and close. The chamfer on the edge 100 is formed with an angle of 45 degrees from the top 14 and the rear 22, extending 102 and 104 at least about 1.7 mm from the top 14 and rear 22, respectively. The lid 30 is substantially coextensive with the housing 12 from top 14 to bottom 16 and from side 24 to side 26. The slider 32 is also substantially coextensive with the housing 12 from side 24 to side 26.

The side handling notches 42 and 44 are symmetrically positioned and configured on the sides 24 and 26 of the housing 12, extending in from the sides 24 and 26 a width 106 between about 1.0 and 3.5 mm, with an exemplary width 106 of at least 3.0 mm. The side handling notches 42 and 44 form openings on the sides 24 and 26 that are between about 3.5 and 5.5 mm deep 110, and between about 2.5 and 9.5 mm tall 112 extending from the top 14 in the direction of the bottom 16. The openings formed by exemplary side handling notches 42 and 44 on the sides 24 and 26 are about 4.5 mm deep 110 and at least 7.0 mm tall 112. The front walls (e.g., 114) of the side handling notches 42 and 44 running in the direction between top 14 and bottom 16 closest to the front 20 of the housing 12 are angled so that the outermost points (e.g., 116) of the front walls (e.g., 114), on the side (e.g., 24) of the housing 12, are located at a distance 122 between about 39.0 and 42.0 mm from plane X 74 toward the rear 22, with an exemplary distance 122 of 40.85 mm, and the innermost points (e.g., 120) of the front walls (e.g., 114) are located at a distance 124 between about 39.0 and 41.5 mm from plane X 74 toward the rear 22, with an exemplary distance 124 of 40.10 mm.

The loading grip 72 has a width 126 of about 11.0 mm and a depth 130 of about 2.3 mm. The loading grip 72 is located at a distance 132 from plane X 74 toward the rear 22 of about 5.0 mm. The loading grip 72 has a height (not shown) below the top 14 between about 0.5 mm and 0.7 mm.

Figure 5:
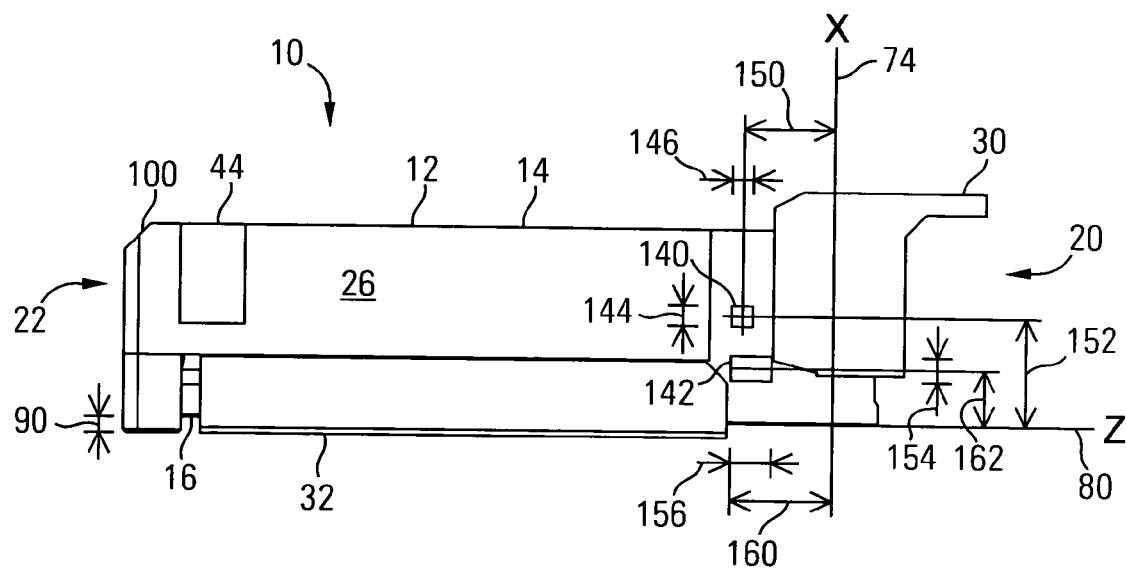
FIG. 5 is a right view of an exemplary media cartridge with an open lid and slider.

Referring now to FIGS. 5 and 8, a "beginning of media" sensor 220 may be provided in a drive (not fully shown) for the media cartridge 10. The beginning of media sensor 220 transmits light into the media cartridge 10 through one window 140 in the right side 26 of the housing 12, and this light is reflected back out another window 142 in the right side 26 of the housing 12 to indicate that the 8 mm tape 28 is near or at the beginning, as will be described in more detail below.

The term "window" is used herein to refer to an aperture or region through which detectable light may pass, either unfilled or filled with a translucent material. For example, the beginning of media sensor windows 140 and 142 may be formed of a clear plastic material adhesively mounted in holes in the opaque wall 26 of the housing 12. Alternatively, the beginning of media sensor windows 140 and 142 may be unfilled holes in the opaque wall 26 of the housing 12.

The first window 140 is substantially square and has a height 144 and depth 146 between about 1.0 and 2.5 mm, with an exemplary height 144 and depth 146 between about 1.50 mm and 1.70 mm. The center point of the first window 140 is located at a distance 150 toward the rear 22 from plane X 74 between about 5.9 and 6.5 mm, with an exemplary distance 150 of about 6.20 mm. The center point of the first window 140 is located at a distance 152 toward the top 14 from plane Z 80 between about 7.4 and 8.0 mm, with an exemplary distance 152 of about 7.65 mm. The second window 142 has a height 154 between about 1.5 and 2.5 mm, with an exemplary height 154 of about 1.8 mm, and a depth 156 between about 2.0 and 5.0 mm, with an exemplary depth 156 of at least about 2.5 mm. The rearmost wall of the second window 142 is located at a distance 160 toward the rear 22 from plane X 74 between about 6.5 and 7.5 mm, with an exemplary distance 160 of about 7.0 mm. The center point of the second window 142 is located at a distance 162 toward the top 14 from plane Z 80 between about 3.6 and 4.2 mm, with an exemplary distance 162 of about 3.9 mm. The light path inside the media cartridge 10 between the windows 140 and 142 will be discussed in more detail below with respect to FIGS. 8 and 9.

Figure 6:
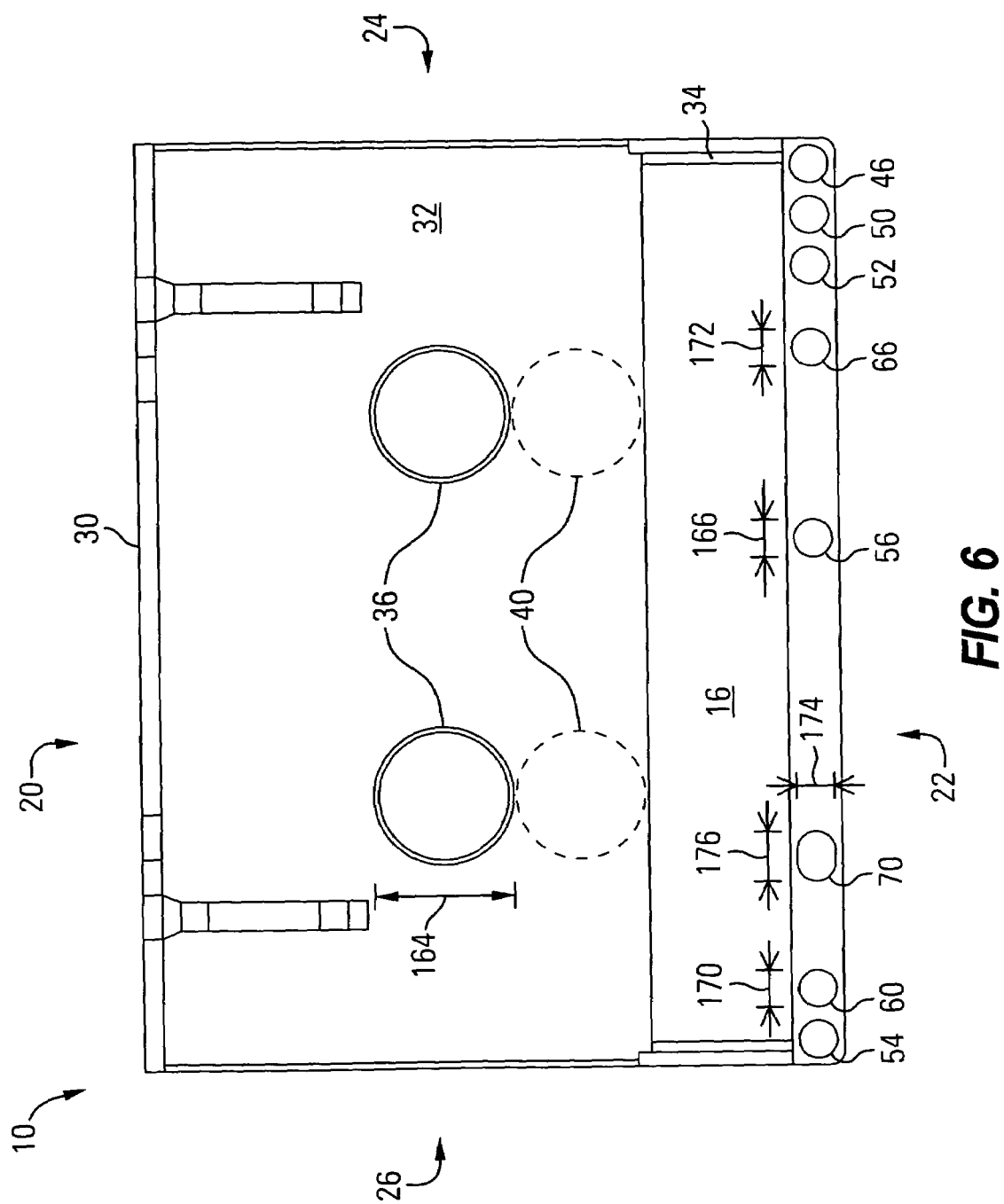
FIG. 6 is a bottom view of an exemplary media cartridge with a closed lid and slider.

The bottom 16 of the housing 12 is illustrated in FIG. 6, with the lid 30 and slider 32 in closed position. The hub access holes 36 in the slider 32 have a diameter 164 of about 10.0 mm. As discussed above, when the slider 32 is open, the hub access holes 36 are substantially aligned with the position 40 of the hubs. The five recognition holes 46-56 each have a diameter 166 of about 2.5 mm. The write-inhibit hole 60 has a diameter 170 of about 2.5 mm. The round sub-datum hole 66 has a diameter 172 between about 2.50 mm and 2.55 mm. The elongate sub-datum hole 70 has a diameter 174 in one direction between about 2.50 mm and 2.55 mm, and a diameter 176 in a perpendicular direction between about 3.5 mm and 3.6 mm.

Figure 7:
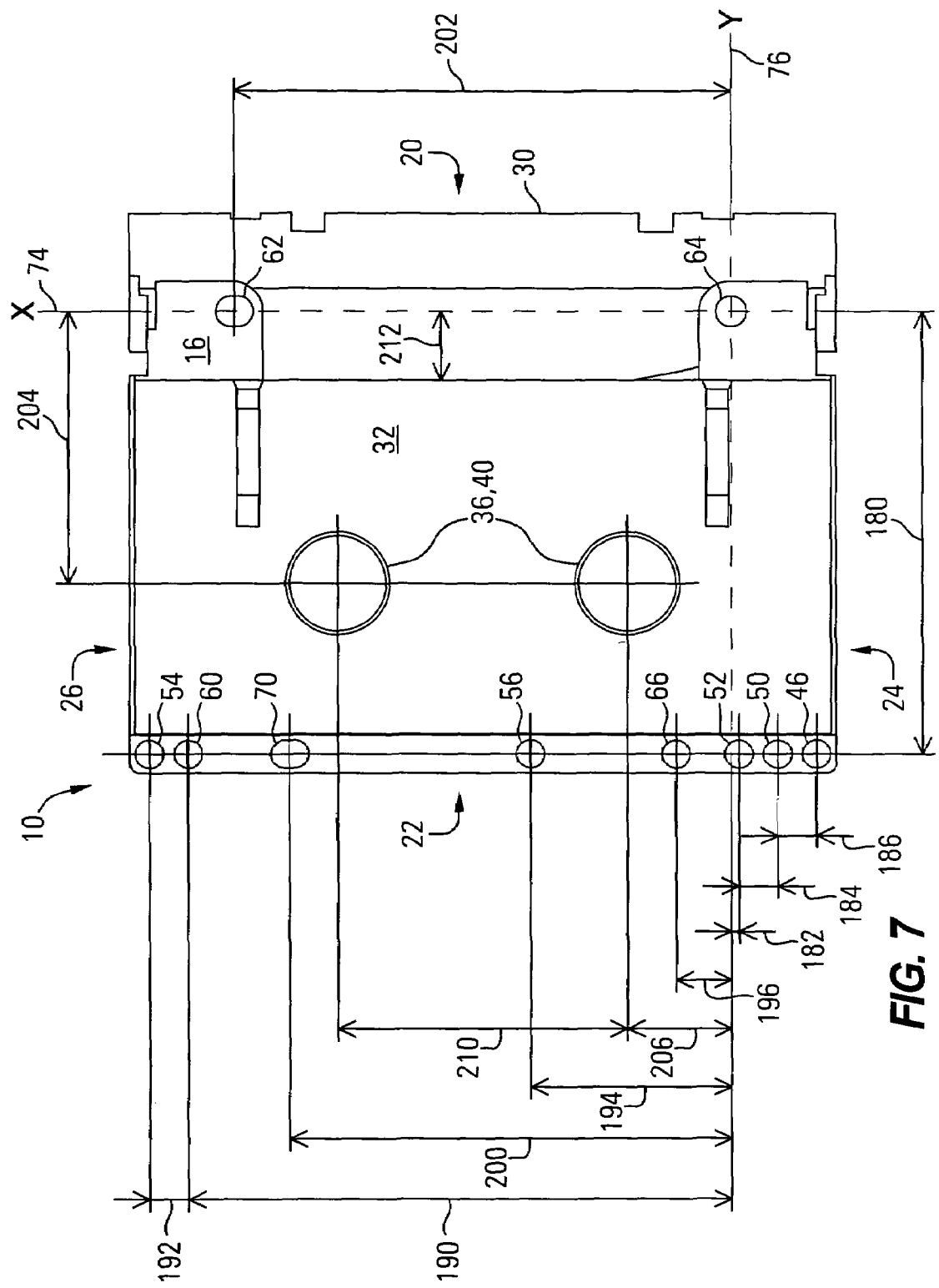
FIG. 7 is a bottom view of an exemplary media cartridge with an open lid and slider.

Referring now to FIG. 7, the centers of the five recognition holes 46-56, the write-inhibit hole 60 and the sub-datum holes 66 and 70 are positioned along a line from side 24 to side 26, parallel with and adjacent the rear 22, at a distance 180 toward the rear 22 from plane X 74 of about 47.2 mm. Recognition hole 52 is centered at a distance 182 toward the left side 24 from plane Y 76 of about 1.0 mm. Recognition hole 50 is centered at a distance 184 toward the left side 24 from the center of recognition hole 52 of about 4.0 mm. Similarly, recognition hole 46 is centered at a distance 186 toward the left side 24 from the center of recognition hole 50 of about 4.0 mm. Write-inhibit hole 60 is centered at a distance 190 toward the right side 26 from plane Y 76 of about 56.0 mm. Recognition hole 54 is centered at a distance 192 toward the right side 26 from the center of write-inhibit hole 60 between about 3.5 and 4.5 mm, with an exemplary distance 192 of 4.0 mm. Recognition hole 56 is centered at a distance 194 toward the right side 26 from plane Y 76 between about 20.0 and 21.0 mm, with an exemplary distance 194 of 20.5 mm. Sub-datum hole 66 is centered at a distance 196 toward the right side 26 from plane Y 76 of about 5.5 mm. Sub-datum hole 70 is centered at a distance 200 toward the right side 26 from plane Y 76 of about 45.5 mm.

Datum holes 62 and 64 are centered on plane X 74. Datum hole 64 is also centered on plane Y 76. Datum hole 62 is also centered at a distance 202 toward the right side 26 from plane Y 76 of about 51.0 mm. When the slider 32 is open as illustrated in FIG. 7, the hub access holes 36 are aligned with the hub locations 40, with their centers located at a distance 204 toward the rear 22 from plane X 74 of about 29.00 mm. The leftmost hub access hole 36 and hub location 40 is centered at a distance 206 toward the right side 26 from plane Y 76 of about 10.5 mm. The rightmost hub access hole 36 and hub location 40 is centered at a distance 210 toward the right side 26 from the center of the leftmost hub access hole 36 and hub location 40 of about 30.0 mm. The frontmost edge of the slider 32, when open, is located at a distance 212 toward the rear 22 from plane X 74 between about 7.0 mm and 7.7 mm.

Referring now to FIG. 8, the beginning of media sensor system will be described in more detail. Two beginning of media sensor windows 140 and 142 (also referred to herein as "tape position sensor openings") are located on the right side 26 of the housing 12 as discussed above and are separated by a distance 214 of about 3.75 mm. The tape 28 has a height 216 of about 8.00 mm. The media cartridge 10 is aligned in a drive so that the beginning of media sensor 220 is adjacent the right side 26 of the media cartridge 10, with both a light transmitter 222 and a light detector 224 aligned with the 8 mm tape 28. In one exemplary embodiment, as illustrated in FIG. 8, a light path 226 passes through the 8 mm tape 28 twice.

A reflector such as a prism 230 is positioned adjacent the 8 mm tape 28 so that the 8 mm tape 28 passes between the prism 230 and the beginning of media sensor windows 140 and 142 in the right side 26 of the housing 12. The exemplary prism 230 is shaped in such a way that the light path 226 enters the prism 230 from the light transmitter 222 and internally reflects back toward the light detector 224. The prism 230 has a front face 232 that is substantially parallel with and positioned nearest to the right side 26 of the housing 12, and an angled top and bottom face 234 and 236 adjoining the front face 232 that form angles of substantially 45 degrees with the front face 232, acting as internal reflecting surfaces for the light path 226 inside the prism 230. The exemplary prism 230 has a rear face 240 parallel with and opposite the front face 232, and extending between the angled top and bottom faces 234 and 236, reducing the width of the prism 230, although not significantly contributing to the directing of the light path 226. In an alternative embodiment, the prism 230 may be formed without a rear face 240 by extending the angled top and bottom faces 234 and 236 until they meet, so that the front face 232 and top and bottom faces 234 and 236 form a triangle.

The exemplary light path 226 is substantially orthogonal to plane Y 76 as it leaves the light transmitter 222 in the drive, passing from the beginning of media sensor 220 to 242 the top beginning of media sensor window 140, to 244 the 8 mm tape 28, to 246 the prism 230. The light path 226 strikes the prism front face 232 substantially orthogonally, entering the prism 230 and reflecting internally off the first angled face 234 directly opposite the light transmitter 222. The reflected light path is substantially orthogonal to plane Z 80 as it travels 250 to the second angled face 236 of the prism 230, directly opposite the light detector 224. The light path 226 again reflects internally in the prism 230 off the second angled face 236 and is directed toward the light detector 224, again substantially orthogonal to plane Y 76. The light path 226 travels to 252 the 8 mm tape 28, then to 254 the bottom beginning of media sensor window 142, and finally to 256 the light detector 224. The light path 226 thus passes through the top and bottom beginning of media sensor windows 140 and 142, through the 8 mm tape 28 twice, and through the prism 230.

The body portion of the 8 mm tape 28 is substantially opaque, so when the body portion of the 8 mm tape 28 is adjacent the beginning of media sensor windows 140 and 142, the light path 226 is blocked. (If the media cartridge is intended for data storage, the body portion comprises a recordable magnetic medium. If the media cartridge is a cleaning cartridge, the body portion is a cleaning material to clean the heads of the drive mechanism.) The 8 mm tape 28 includes a translucent segment near the end (or beginning) of the tape to indicate the transition between the body portion and the end or ends of the tape. In the exemplary embodiment, this is a translucent leader attached to the 8 mm tape 28 between the body portion and the hub which allows the light path 226 to pass through the 8 mm tape 28. Note that no distinction is made in this description between the two ends of the 8 mm tape 28, so rather than discuss a leader at one end of the 8 mm tape 28 and a trailer at the other end, either or both ends may have a translucent segment. Note also that the leader need not be uniformly translucent. For example, the leader may include alternating translucent and opaque bands to provide information to the drive.

In an alternative embodiment, the translucent segment of the 8 mm tape 28 may be a window in the 8 mm tape, either made of a translucent material, or comprising an unfilled opening in the opaque material of the tape. Thus, when the translucent segment of the 8 mm tape 28 is adjacent the beginning of media sensor windows 140 and 142, the light path 226 is allowed to pass through the media cartridge 10 to the light detector 224.

Note that the terms "opaque" or "blocked" and "translucent" as used herein are not necessarily absolute terms. Even when the opaque portion of the 8 mm tape 28 is blocking the light path 226, some small amount of light may be able to pass through the media cartridge 10, and when the translucent portion of the 8 mm tape 28 is positioned adjacent the windows 140 and 142 to pass the light path 226, the light may be attenuated somewhat as it passes through the media cartridge 10. The exact levels of light transmittance of the beginning of media sensor windows 140 and 142, the prism 230, and the opaque and translucent portions of the 8 mm tape 28 may vary between different embodiments. In one embodiment, the light detector 224 in the drive for which the media cartridge 10 is intended can detect the difference in light intensity indicating the beginning of the tape. For example, in one embodiment, the light transmittance of the opaque portion of the 8 mm tape 28 is a maximum of about 5%, and the light transmittance of the translucent portion of the 8 mm tape 28 is a minimum of about 65%.

The prism 230 may be sized and configured as desired to provide the light path 226 described above. The angles presented by the various faces to the light path 226 enable sufficient light to reflect through the prism 230 to be detectable by the light detector 224 in the drive for which the media cartridge 10 is intended.

The prism 230 may be mounted in the housing 12 in any suitable fashion. For example, the external surfaces of any or all of the rear face 240, the angled top and bottom faces 234 and 236, or end faces (not shown) nearest the front 20 and back 22 of the housing 12 may be used as mounting surfaces, upon which support members may be attached to securely position the prism 230 in place in the housing 12. A portion of the front face 232 may even be used as a mounting surface, as long as the light path 226 through the front face 232 is not blocked. The prism 230 may be mounted in place using any suitable fastening mechanism. For example, the prism 230 may be mounted in place using an adhesive. Alternatively, the prism 230 may be held in place by upper and lower molded portions of the housing 12 which, when brought together, enclose the prism 230, firmly holding it in position. The prism 230 is positioned so that the front face 232 is located at a distance 260 from the side of the beginning of media sensor 220 of about 13.20 mm. The media cartridge 10 is positioned in the drive so that plane Y 76 is located at a distance 262 from side of the beginning of media sensor 220 of about 64.20 mm.

The light path 226 may be routed inside the housing 12 in any suitable manner and in any configuration. For example, the prism 230 discussed above may be used to direct the light path 226, or other means for directing the light path 226 may be used, such as mirrors or light pipes. The light path 226 may also be routed about inside the housing 12 as desired, as long as it passes through the 8 mm tape 28 at least once to indicate the beginning of the body portion. In one alternative embodiment, a light path 270 (FIG. 9) passes through the 8 mm tape 28 only once, and is routed by a prism 272 around an edge (e.g., 274) of the 8 mm tape 28.

Note that the direction in which the light path 226 travels through the media cartridge 10 may be adapted as desired, and that in alternative embodiments the direction may be reversed by switching the positions of the light transmitter 222 and light detector 224.

While illustrative embodiments have been described in detail herein, it is to be understood that the concepts disclosed herein may be otherwise variously embodied and employed, and that the appended claims are intended to be construed to include such variations, except as limited by the prior art. For example, a recitation in the claims of "a pair of beginning of tape sensor windows" or "two reflective surfaces" should not be viewed as limiting a cartridge to only two windows or only two reflective surfaces.

What is claimed is:

1. A media cartridge, comprising:
   a housing;
   a tape;
   at least two tape position sensor openings in said housing adjacent said tape, wherein said at least two tape position sensor openings are separated by a distance that is less than a height of said tape, and
   at least one reflector mounted inside said housing adjacent said at least two tape position sensor openings with said tape passing between said at least one reflector and said at least two tape position sensor openings so that a light path that enters said housing through one of said at least two tape position sensor openings and passes through said tape is directed out of said housing through another of said at least two tape position sensor openings, wherein said light path passes through said tape twice.

2. A tape cartridge, comprising:
   a pair of beginning of tape sensor windows in a wall of said cartridge;
   a prism having two reflective surfaces, said prism being mounted in said cartridge so that each of said two reflective surfaces is adjacent a different one of said pair of beginning of tape sensor windows;
   an 8 mm tape mounted on two rotating hubs in said cartridge and passing between said pair of beginning of tape sensor windows and said prism, wherein said pair of beginning of tape sensor windows has a separation distance that is less than a height of said 8 mm tape, so that a light path from one of said pair of beginning of tape sensor windows passes through said 8 mm tape, against each of said two reflective surfaces, through said 8 mm tape a second time, to another of said pair of beginning of tape sensor windows.

3. The tape cartridge of claim 2, said 8 mm tape having an opaque body portion and a translucent leader at an end of said 8 mm tape, wherein detectable light may traverse said light path when said leader is positioned between said pair of beginning of tape sensor windows and said prism, and wherein light is substantially blocked along said light path when said opaque body portion is positioned between said pair of beginning of tape sensor windows and said prism.

4. The tape cartridge of claim 2, further comprising five recognition holes aligned in a row on a second wall of said cartridge in spaced-apart relation.

5. The tape cartridge of claim 2, further comprising:
   a chamfered edge between a rear wall of said cartridge and a top wall of said cartridge; and
   a lid pivotally attached to said cartridge at a front opposite said rear wall of said cartridge.

6. The tape cartridge of claim 2, further comprising handling notches on each of two opposite side walls of said cartridge.

7. The tape cartridge of claim 2, said cartridge being between about 72.5 and 73.5 mm wide, about 53.5 and 54.5 mm deep, and about 14.2 and 15.2 mm tall.

8. The tape cartridge of claim 2, said 8 mm tape comprising a magnetic recordable tape.

9. The tape cartridge of claim 2, said 8 mm tape comprising a cleaning tape for a magnetic data storage drive.

10. A tape cartridge, comprising:
    a housing having a top, bottom, front, rear, and two sides, said top being between about 72.5 and 73.5 mm wide and about 53.5 and 54.5 mm deep, said sides being between about 14.2 and 15.2 mm tall, wherein an edge formed by an intersection of said top and said rear is chamfered;
    five recognition holes formed in said bottom;
    a side handling notch on each of said two sides;
    an 8 mm tape wound on two rotatable hubs inside said housing, said 8 mm tape having a substantially opaque body and a substantially translucent leader at an end;
    a pair of beginning of media sensor windows in one of said two sides, a center of each of said pair of beginning of media sensor windows being separated by about 3.75 mm, said 8 mm tape being positioned adjacent both of said pair of beginning of media sensor windows; and
    a prism having a pair of internally reflective surfaces, said prism being positioned inside said housing adjacent said 8 mm tape and said pair of beginning of media sensor windows so that said 8 mm tape passes between said pair of beginning of media sensor windows and said prism, wherein a light path passes in one of said pair of beginning of media sensor windows substantially parallel to said top, through said 8 mm tape and into said prism, reflects off one of said pair of internally reflective surfaces and travels substantially parallel to said two sides, reflects off another of said pair of internally reflective surfaces, and travels out of said prism, substantially parallel to said top, hack through said 8 mm tape and out another of said pair of beginning of media sensor windows, and wherein said light path is blocked when said translucent leader is not positioned adjacent said pair of beginning of media sensor windows and is not blocked when said translucent leader is positioned adjacent said pair of beginning of media sensor windows.

* * * * *

UNITED STATES PATENT AND TRADEMARK OFFICE
CERTIFICATE OF CORRECTION

PATENT NO. : 7,274,535 B2  Page 1 of 1
APPLICATION NO. : 10/996882
DATED : September 25, 2007
INVENTOR(S) : Stephen Deckers It is certified that error appears in the above-identified patent and that said Letters Patent is hereby corrected as shown below:

On the Title Page Item (73), under "Assignee", delete "LP." and insert -- L.P. --, therefor.

In column 8, line 12, in Claim 5, delete "cart:ridge" and insert -- cartridge --, therefor.

In column 8, line 57, in Claim 10, delete "hack" and insert -- back --, therefor.

Signed and Sealed this

Twenty-fourth Day of June, 2008

JON W. DUDAS
*Director of the United States Patent and Trademark Office*